(12) United States Patent
Waggle et al.

(10) Patent No.: US 8,388,270 B2
(45) Date of Patent: Mar. 5, 2013

(54) SLOTTING CUTTER WITH CANTILEVERED MEMBER

(75) Inventors: James Michael Waggle, Derry, PA (US); Kevin Michael Gamble, Stahlstown, PA (US)

(73) Assignee: Kennametal Inc., Latrobe, PA (US)

( * ) Notice: Subject to any disclaimer, the term of this patent is extended or adjusted under 35 U.S.C. 154(b) by 491 days.

(21) Appl. No.: 12/695,339

(22) Filed: Jan. 28, 2010

(65) Prior Publication Data

US 2011/0182678 A1    Jul. 28, 2011

(51) Int. Cl.
  B23C 5/08    (2006.01)
  B23C 5/22    (2006.01)
(52) U.S. Cl. ............ 407/49; 407/109; 83/659; 144/235
(58) Field of Classification Search .............. 407/41, 407/49–52, 102, 108, 109; 144/218, 231–235, 144/176; 83/659, 835–843; *B23C 5/08, B23C 5/22*
See application file for complete search history.

(56) References Cited

U.S. PATENT DOCUMENTS

| | | | | |
|---|---|---|---|---|
| 867,275 A * | 10/1907 | Hunter | | 407/45 |
| 1,046,737 A * | 12/1912 | Conklin | | 407/45 |
| 1,153,682 A * | 9/1915 | Gorton | | 407/46 |
| 1,226,047 A | 5/1917 | Anderson | | |
| 1,458,671 A * | 6/1923 | Westgard | | 83/836 |
| 1,549,036 A * | 8/1925 | Westgard | | 144/230 |
| 1,642,185 A * | 9/1927 | Westgard | | 83/836 |
| 1,707,903 A | 4/1929 | Charlton | | |
| 1,752,541 A | 4/1930 | Orr | | |
| 1,756,986 A * | 5/1930 | Miller | | 407/44 |
| 2,347,136 A | 4/1944 | Speckert | | |
| 2,962,800 A | 12/1960 | Swenson | | |
| 2,982,009 A | 5/1961 | Swenson | | |
| 3,775,818 A | 12/1973 | Sirola | | |
| 4,363,576 A * | 12/1982 | Zweekly | | 407/50 |
| 4,580,930 A * | 4/1986 | Zinner | | 407/110 |
| 5,054,354 A * | 10/1991 | Kubis | | 83/835 |
| 5,761,981 A * | 6/1998 | Stoffels | | 83/840 |
| 5,820,309 A * | 10/1998 | Mihic | | 407/50 |
| 6,056,484 A * | 5/2000 | Mitchell et al. | | 407/36 |
| 6,511,264 B2 * | 1/2003 | Ripley | | 407/36 |
| 7,182,112 B2 * | 2/2007 | Meados | | 144/117.1 |
| 2005/0207854 A1 * | 9/2005 | Hecht | | 407/117 |
| 2009/0000454 A1 * | 1/2009 | Baernthaler et al. | | 83/843 |

FOREIGN PATENT DOCUMENTS

JP    52001680 A  *  1/1977

* cited by examiner

*Primary Examiner* — Andrea Wellington
*Assistant Examiner* — Sara Addisu
(74) *Attorney, Agent, or Firm* — Larry R. Meenan, Esq.

(57) ABSTRACT

A slotting cutter includes a disc-like cutter body rotatable in a predetermined direction on a central axis perpendicular to a plane of the cutter body. A plurality of cutting insert receiving pockets and a corresponding number of wedge receiving pockets are formed about a perimeter of the body. A cutting insert is replaceably mounted in each insert receiving pocket of the cutter body, and a clamping wedge is replaceably mounted in each wedge receiving pocket of the cutter body. A cantilevered member is disposed between each insert receiving pocket and a respective wedge receiving pocket to securely hold the cutting insert in the cutter body.

19 Claims, 4 Drawing Sheets

SLOTTING CUTTER WITH CANTILEVERED MEMBER

BACKGROUND OF THE INVENTION

Slotting cutters are known for cutting keyways and the like and, also, for providing work members with slots of various width.

Slotting cutters are somewhat similar to milling cutters in that the cutter usually employs a disc-like member having cutting inserts mounted in the periphery thereof. In a milling cutter, the cutting inserts are generally presented axially, whereas, in a slotting cutter, the cutting inserts protrude radially from the supporting disc and are, thus, presented to the work in the radial direction.

In order to form slots rapidly and efficiently, it is desirable that the cutting inserts be solidly supported in the cutter body and have adequate clearance between the cutting edges of the inserts and the cutter body as the material is removed from the work piece. With the inserts solidly supported and having sufficient clearance between the cutter body and the cutting edges, the slotting cutter is able to withstand substantial loads and can cut extremely rapidly, freely and accurately.

Most slotting cutters clamp the insert in the cutter body by means of an insert pocket with a "saw-cut" clamp design, and an insert with a slight taper angle. This "saw-cut" design allows for the insert pocket area to spread open when the insert is seated, which creates a spring-type taper clamping effect on the insert. In order for the slotting cutter to have minimal radial run-out, an additional seating surface feature is usually added to the pocket area. This seating surface creates a positive stop, which minimizes the accumulated radial run-out that could exist without this feature. This seating surface also distributes the radial cutting forces into the slotting cutter body, which in turn keeps the insert pocket from spreading open even further.

The existing pocket designs are completely dependent on the spring ability of the cutter body to securely clamp the insert, and does not allow for pocket wear or manufacturing dimensional variations of the insert and pocket. It would be desirable to provide a design that overcomes the inability to compensate for pocket wear or manufacturing dimensional variations of the insert and pocket.

SUMMARY OF THE INVENTION

In one aspect of the invention, a slotting cutter comprises a disc-like cutter body rotatable in a predetermined direction on a central axis perpendicular to a plane of the cutter body. A plurality of cutting insert receiving pockets are formed about a perimeter of the body. A plurality of wedge receiving pockets are formed about the perimeter of the cutter body. A cutting insert is replaceably mounted in each insert receiving pocket of the cutter body. A clamping wedge is replaceably mounted in each wedge receiving pocket of the cutter body. A cantilevered member is disposed between each insert receiving pocket and a respective wedge receiving pocket. When the clamping wedge is urged into the wedge receiving pocket, the cantilevered member provides a biasing force against the cutting insert to securely hold the cutting insert in the insert receive pocket.

In one embodiment, the cantilevered member includes an undercut feature in the form of a pair of opposing grooves; one groove in the top wall and the other groove in the bottom wall to reduce the thickness of the cantilevered member.

In another embodiment, the cantilevered member includes a rack and pinion feature in the form of a plurality of grooves and a plurality of bumps therebetween.

BRIEF DESCRIPTION OF THE DRAWINGS

While various embodiments of the invention are illustrated, the particular embodiments shown should not be construed to limit the claims. It is anticipated that various changes and modifications may be made without departing from the scope of this invention.

DETAILED DESCRIPTION OF THE INVENTION

Figure 1:
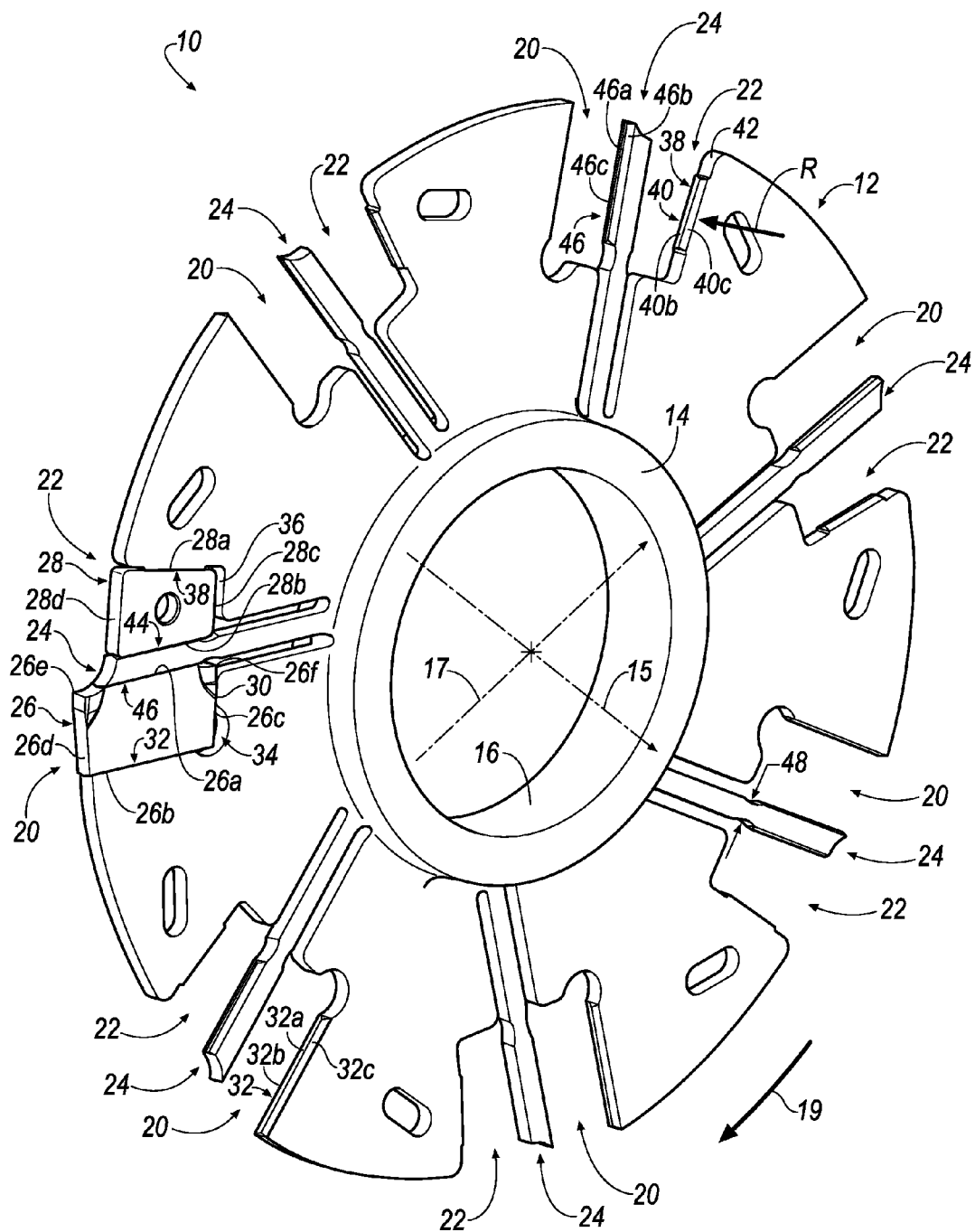
FIG. 1 is a perspective view of a slotting cutter with a cantilevered member according to an embodiment of the invention.
Figure 2:
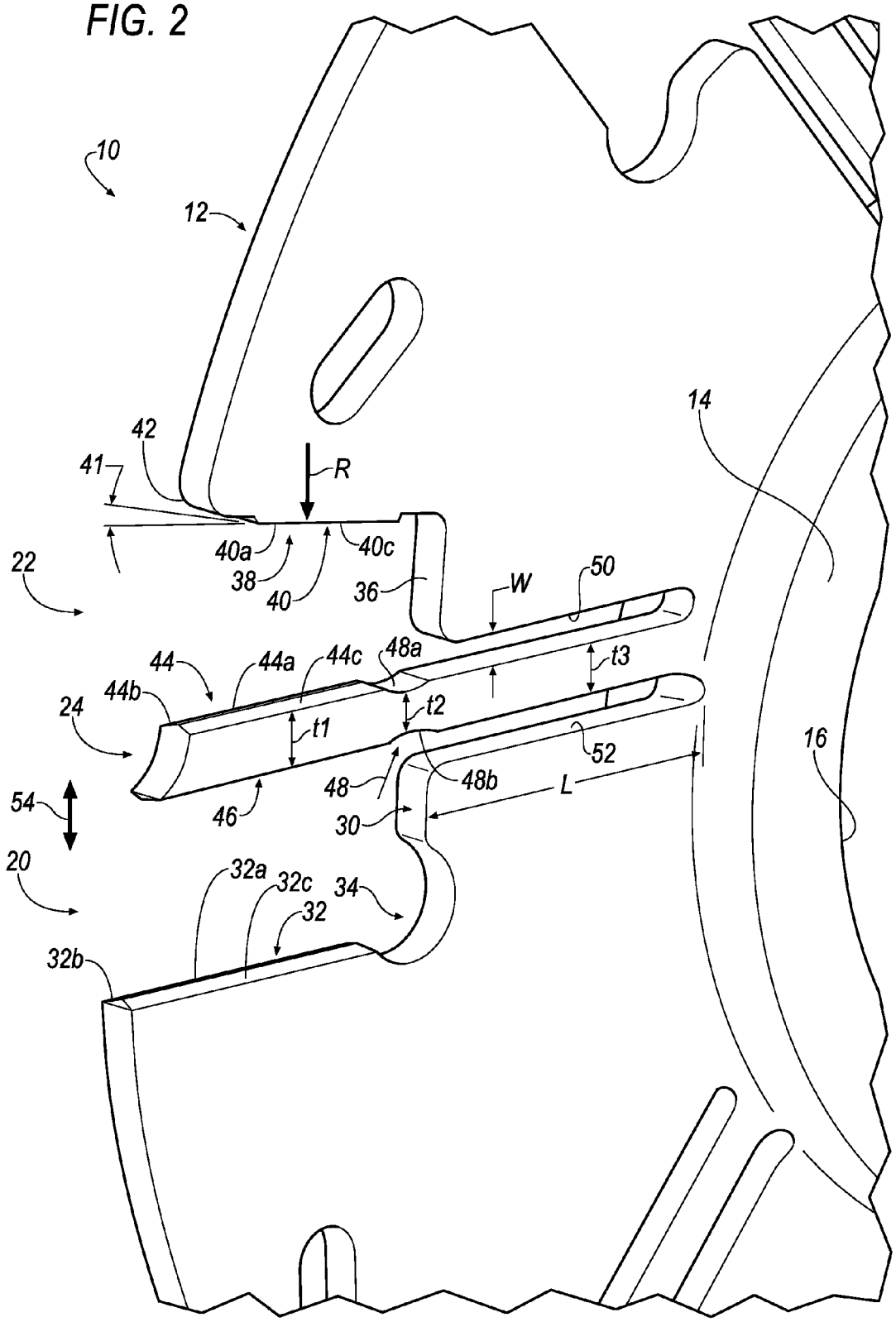
FIG. 2 is an enlarged partial perspective view side view of the wedge receiving pocket, the insert receiving pocket and the cantilevered member of the slotting cutter of FIG. 1 with the cutting insert and wedge removed for clarity.

Referring now to FIGS. 1 and 2, a slotting cutter 10 is shown according to an embodiment of the invention. The slotting cutter 10 includes a disc-like cutter body 12 having a central hub region 14 that is provided with a bore 16 for receiving a support shaft. The slotting cutter 10 rotates on a central axis 15 perpendicular to a plane 17 of the cutter body 12 in a predetermined direction (indicated by the arrow 19). The central hub region 14 may also be provided with an optional keyway for receiving a drive key (not shown).

The slotting cutter 10 is provided with a plurality of cutting insert receiving pockets 20 formed about the perimeter of the cutter body 12. It will be appreciated that most any suitable number of pockets 20 may be formed about the perimeter of the cutter body 12, depending on the desired material of the work piece to be cut and the diameter of the cutter body 12. In the illustrated embodiment, the slotting cutter 10 includes seven pockets 20 equally spaced about the perimeter of the cutter body 12.

The slotting cutter 10 is also provided with a plurality of wedge receiving pockets 22 formed about the perimeter of the cutter body 12. The number of wedge receiving pockets 22 corresponds to the number of insert receiving pockets 20. A cantilevered member 24 is disposed between each insert receiving pocket 20 and a respective wedge receiving pocket 22.

As shown in FIG. 1, a cutting insert 26 is replaceably mounted in each insert receiving pocket 20 of the cutter body 12 and a clamping wedge 28 is replaceably mounted in each wedge receiving pocket 22 of the cutter body 12. As described in more detail below, the combination of the cantilevered member 24 and the clamping wedge 28 comprises a locking mechanism by which the cutting insert 26 is securely held in the cutter body 12.

As shown in FIGS. 1 and 2, the insert receiving pocket 20 is defined by a rearward wall 30, a bottom wall 32 and a radius 34 at the intersection between the rearward wall 30 and the bottom wall 32. The rearward wall 30 acts as a stop for the end walls 26c, 26d of the cutting insert 26 to prevent further inward radial movement of the cutting insert 26 when mounted in the insert receiving pocket 20. The bottom wall 32 is complementary in shape to at least one of the top and bottom walls 26a, 26b of the cutting insert 26. In the illustrated embodiment, the bottom 32 is complementary in shape to the bottom wall 26b of the cutting insert 26. In the illustrated embodiment, the bottom wall 32 includes a substantially flat central portion 32a separating a pair of angled side walls 32b, 32c. In another embodiment, the bottom wall 32 is substantially V-shaped in which the central portion 32a is omitted.

The wedge receiving pocket 22 is defined by a rearward wall 36 and a top wall 38 for engaging the clamping wedge 28. The rearward wall 36 acts as a stop for the end surface 28c of the clamping wedge 28 to prevent further inward radial movement of the clamping wedge 28 when mounted in the wedge receiving pocket 22. The top wall 38 of the wedge receiving pocket 22 includes a pad 40 that can be complementary in shape to the top surface 28a of the clamping wedge 28. In one embodiment, the pad 40 is defined by a substantially flat central portion 40a separating a pair of angled side walls 40b, 40c. In another embodiment, the pad 40 is substantially V-shaped in which the central portion 32a is omitted. The pad 40 is also defined by a large radius of curvature, R, in the radial direction.

The top wall 38 of the wedge receiving pocket 22 is formed at a taper angle 41 with respect to the top surface 44 of the cantilevered member 24. The taper angle 41 can be in the range between about one (1) degree and about twenty (20) degrees, and preferably in the range between about five (5) degrees and about fifteen (15) degrees, and most preferably between about five (5) degrees and about ten (10) degrees. In the illustrated embodiment, the taper angle 41 is about five (5) degrees. The front or most radially outward end of the top wall 38 includes a radiused surface 42 to allow the clamping wedge 28 to be easily inserted into the wedge receiving pocket 22.

The cantilevered member 24 includes a top surface 44 for engaging the clamping wedge 28 and a bottom surface 46 for engaging the cutting insert 26. It is noted that the top surface 44 of the cantilevered member 24 also defines the bottom wall of the wedge receiving pocket 22, and the bottom surface 46 of the cantilevered member 24 also defines the top wall of the insert receiving pocket 20. In general, the top surface 44 of the cantilevered member 24 is complementary in shape to the bottom surface 28b of the clamping wedge 28. In one embodiment, the top surface 44 includes a substantially flat central portion 44a separating a pair of angled side walls 44b, 44c. In another embodiment, the top surface 44 is substantially V-shaped in which the central portion 44a is omitted.

As shown in FIG. 1, the bottom surface 46 of the cantilevered member 24 is complementary in shape to the top surface 28a of the cutting insert 26. In one embodiment, the bottom surface 46 includes a substantially flat central portion 46a separating a pair of angled side walls 46b, 46c. In another embodiment, the bottom surface 46 is substantially V-shaped in which the central portion 46a is omitted. As seen in FIG. 2, the top surface 44 and the bottom surface 46 are substantially parallel to each other such that the cantilevered member has a substantially uniform thickness, $t_1$, along its entire length. The thickness, $t_1$, of the cantilevered member 24 can be selectively adjusted to vary the amount of flexibility of the cantilevered member 24. In addition, the bottom surface 46 of the cantilevered member 24 and the bottom wall 32 of the insert receiving pocket 20 are substantially parallel to each other to allow an indexable cutting insert 24 to be mounted in the insert receiving pocket 20.

In the illustrated embodiment, the cantilevered member 24 includes an undercut feature 48 in the form of a pair of opposing grooves; one groove 48a in the top wall 44 and the other groove 48b in the bottom wall 46. The undercut feature 48 reduces the thickness, $t_1$, of the cantilevered member 24 to a smaller thickness, $t_2$, at an appropriate location along the cantilevered member 24. In the illustrated embodiment, the undercut feature 48 is located approximately the same radial distance from the central axis 15 as the rearward wall 30 of the insert receiving pocket 20. The undercut feature 48 causes the cantilevered member 24 to act as a hinge to allow the bottom surface 46 of the cantilevered member 24 to more easily and uniformly engage the entire top surface 26a of the cutting insert 26.

The amount of flexibility of the cantilevered member 24 can be selectively adjusted by varying the thickness, $t_2$, of the undercut feature 48. In addition, the amount of flexibility of the cantilevered member 24 can be selectively adjusted by varying the thickness, $t_3$, of the cantilevered member 24 between the undercut feature 48 and the cutter body 12. In one embodiment, the thickness $t_3$, is larger than the thickness, $t_2$, but smaller than the thickness, $t_1$. In another embodiment, the thickness $t_3$, is larger than the thickness, $t_2$, and substantially equal to the thickness, $t_1$. In yet another embodiment, the thickness $t_3$, is larger than both the thicknesses $t_1$ and $t_2$.

In addition to the undercut feature 48, a pair of slots 50, 52 extend radially inward from the rearward wall 36 of the wedge receiving pocket 22 and the rearward wall 30 of the insert receiving pocket 20 into the cutter body 12 to allow the cantilevered member 24 to flex in the upward and/or downward direction, as indicated by the arrows 54. Each slot 50, 52 has a width, W, and a length, L.

In operation, the cutting insert 26 is inserted into the insert receiving pocket 20 and the clamping wedge 28 is inserted into the wedge receiving pocket 22. A well-known tool, such as a spanner wrench (not shown), is used to cause the clamping wedge 28 to move radially inward toward the central hub region 14 of the slotting cutter 10. As the clamping wedge 28 moves radially inward, the angle 41 formed by the top surface 38 of the wedge receiving pocket 22 with respect to the top surface 44 of the cantilevered member 24 urges the cantilevered member 24 downwardly in the direction of the arrow 54 against the cutting insert 26 to securely hold the cutting insert 26 in the insert receiving pocket 20. The undercut feature 48 allows the bottom surface 46 of the cantilevered member 24 to hinge and more easily engage the entire top surface 26a of the cutting insert 26 to more securely hold the cutting insert 26 in the insert receiving pocket 20 as compared to conventional slotting cutters.

In the embodiment shown in FIGS. 1 and 2, each of the cutting inserts 26 is provided with cutting edge 26e, 26f. Thus, each cutting insert 22 has two cutting edges 26e, 26f and these cutting edges 26e, 26f can be selectively presented to working position by loosening the wedge 28, removing the cutting insert 26, and rotating the cutting insert 26 one-hundred eighty (180) degrees about a vertical axis, and then again clamping the cutting insert 26 in the cutter body 12.

Figure 3:
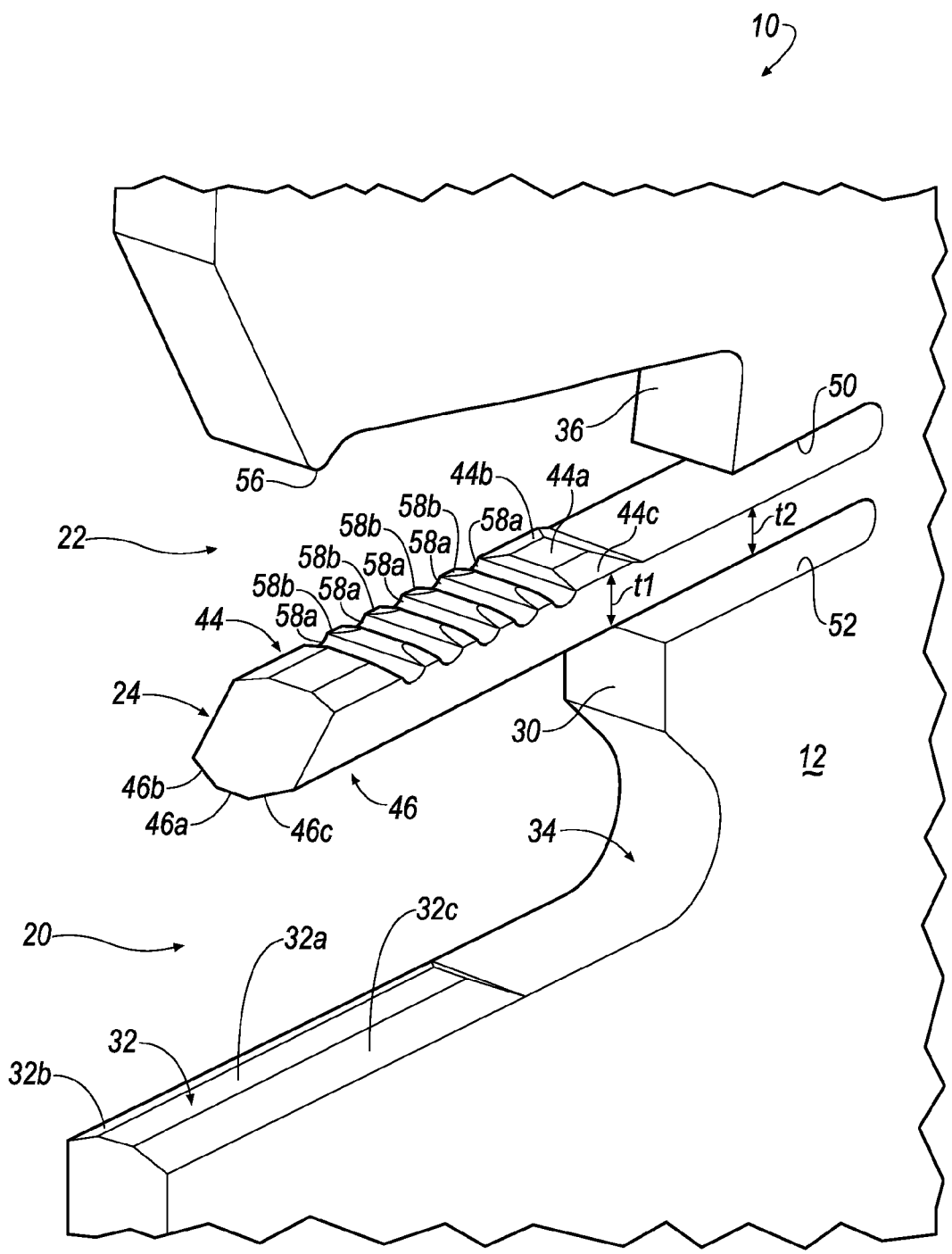
FIG. 3 is an enlarged partial perspective view side view of the wedge receiving pocket, the insert receiving pocket and a cantilevered member of a slotting cutter according to another embodiment of the invention with the cutting insert and wedge removed for clarity.
Figure 4:
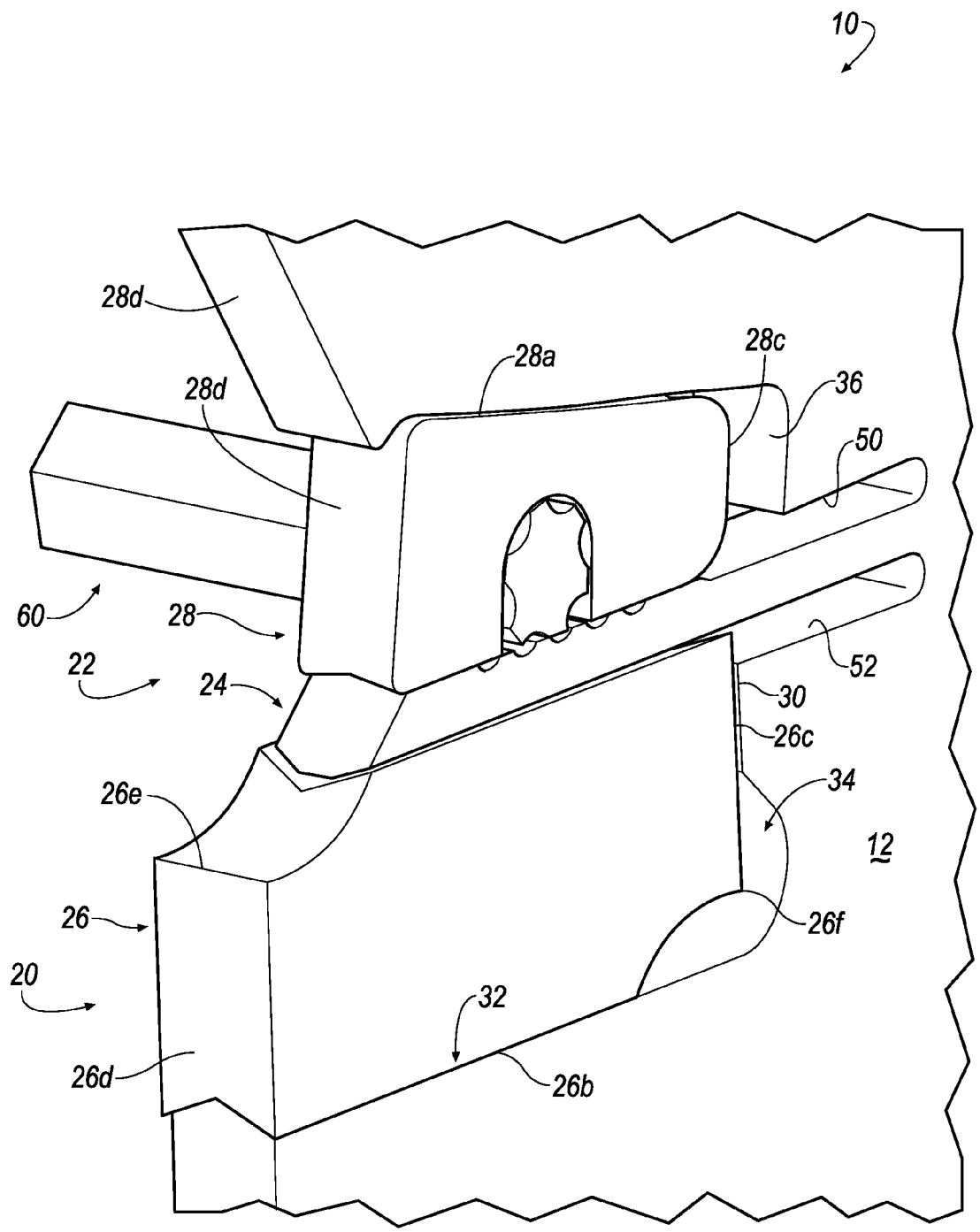
FIG. 4 is an enlarged partial view of the slotting cutter of FIG. 3 with a tool urging the clamping wedge into the wedge receiving pocket to cause the cantilevered member to provide a biasing force against the cutting insert to securely hold the cutting insert in the insert receiving pocket.

It will be appreciated that the cantilevered member 24 can be any suitable design to provide an adequate biasing force against the cutting insert, and that the invention is not limited to the particular design of the cantilevered member 24 described above. For example, the top surface 44 of the cantilevered member 24 may include a rack feature 58 in the form of a plurality of grooves 58a forming a plurality of bumps 58b therebetween, as shown in FIGS. 3 and 4. In the illustrated embodiment, the rack feature 58 comprises a total of five grooves 58a and four bumps 58b. However, it will be appreciated that the invention can be practiced with any desirable number of grooves and bumps to provide adequate biasing force against the cutting insert 26.

In this embodiment, the front end or radially outward end of the top wall 38 of the wedge receiving pocket 22 includes a wedge retaining feature in the form of a lip 56 to prevent unwanted movement of the clamping wedge 28 in the radially outward direction.

As seen in FIG. 3, the thickness, $t_1$, of the front portion or the radially outward portion of the cantilevered member 24 is greater than the thickness, $t_2$, of the rear portion or the radially inward portion of the cantilevered member 24. The thicknesses, $t_1$ and $t_2$, of the cantilevered member 24 can be selectively adjusted to vary the amount of flexibility of the cantilevered member 24.

In operation, a rack and pinion splined wrench 60, such as a Torx® splined wrench, TorxPlus® splined wrench, and the like, is utilized to cause the clamping wedge 28 to be moved radially inward toward the central hub region 14 of the slotting cutter 10, as shown in FIG. 4. As the clamping wedge 28 moves radially inward, the tapered angle 41 formed by the top surface 38 of the wedge receiving pocket 22 with respect to the top surface 44 of the cantilevered member 24 urges the cantilevered member 24 downwardly in the direction of the arrow 54 against the cutting insert 26 to securely hold the cutting insert 26 in the insert receiving pocket 20.

In the embodiment shown in FIGS. 3 and 4, each of the cutting inserts 26 is provided with a pair of cutting edge 26e, 26f; one cutting edge 26e on the end of the top surface 26a, and the other cutting edge 26f on the end of the bottom surface 26b. Thus, each cutting insert 26 has two cutting edges 26e, 26f and these cutting edges 26e, 26f can be selectively presented to working position by loosening the wedge 28, removing the cutting insert 26, and rotating the cutting insert 26 one-hundred eighty (180) degrees about both a vertical axis and a horizontal axis, and then again clamping the cutting insert 26 in the cutter body 12.

As described above, the slotting cutter 10 of the invention includes a clamping mechanism comprising the combination of the clamping wedge 28 and the cantilevered member 24 to provides a biasing force against the cutting insert 26 to securely hold the cutting insert 26 in the insert receiving pocket 20 during machining operations. It should be noted that the top wall 38 of the wedge receiving pocket 22 includes a taper angle 41 with respect to the top surface 44 of the cantilevered member 24 that allows the cutting insert 26 to have substantially parallel top and bottom surfaces 26a, 26b. These substantially parallel surfaces 26a, 26b allow the cutting insert to be indexably mounted in the insert receiving pocket 20, unlike conventional slotting cutters in which the cutting insert includes a taper angle.

Moving the taper angle from the insert to this additional clamping mechanism allows for the insert to be properly clamped, even when pocket wear or insert dimensional variations exist. Because this additional clamping mechanism does not contain a positive stop, additional clamping travel/force is available, which is an improvement over the existing designs. With the clamping taper being removed from the insert, the invention also allows for the possibility of a double-sided insert, so the insert can be indexed to a new cutting edge for additional tool life.

The patents and publications referred to herein are hereby incorporated by reference.

Having described presently preferred embodiments the invention may be otherwise embodied within the scope of the appended claims.

What is claimed is:

1. A slotting cutter, comprising:
    a disc-like cutter body rotatable in a predetermined direction on a central axis perpendicular to a plane of the cutter body;
    a plurality of cutting insert receiving pockets formed about a perimeter of the body;
    a plurality of wedge receiving pockets formed about the perimeter of the cutter body;
    a cutting insert replaceably mounted in each insert receiving pocket of the cutter body;
    a clamping wedge replaceably mounted in each wedge receiving pocket of the cutter body;
    a cantilevered member disposed between each insert receiving pocket and a respective wedge receiving pocket, the cantilevered member including an undercut feature and a pair of slots extending radially inward with respect to the undercut feature toward the central axis of the cutter body, each slot having a width and a length,
    wherein a thickness, $t_3$, of the cantilevered member along the entire length of the pairs of slots is greater than a thickness, $t_2$, of the cantilevered member at the undercut feature.

2. The slotting cutter according to claim 1 wherein the undercut feature comprises opposing grooves that are located at a radial distance from the central axis approximately equal to a rearward wall of the plurality of cutting insert receiving pockets.

3. The slotting cutter according to claim 1, wherein the cantilevered member includes a rack feature in the form of a plurality of grooves and a plurality of bumps therebetween for cooperating with a rack and pinion splined wrench to move the clamping wedge in a radial direction with respect to the central axis of the cutter body.

4. The slotting cutter according to claim 1, wherein the cantilevered member includes a top surface for engaging the clamping wedge and a bottom surface for engaging the cutting insert.

5. The slotting cutter according to claim 4, wherein the top surface of the cantilevered member is complementary in shape to a bottom surface of the clamping wedge.

6. The slotting cutter according to claim 4, wherein the bottom surface of the cantilevered member is complementary in shape to a top surface of the cutting insert.

7. The slotting cutter according to claim 4, wherein the insert receiving pocket is defined by a rearward wall, a bottom wall and a radius at the intersection between the rearward wall and the bottom wall.

8. The slotting cutter according to claim 4, wherein the wedge receiving pocket is defined by a rearward wall and a top wall for engaging the clamping wedge.

9. The slotting cutter according to claim 8, wherein the top wall of the wedge receiving pocket is formed at a taper angle with respect to the top surface of the cantilevered member.

10. A slotting cutter, comprising:
    a disc-like cutter body rotatable in a predetermined direction on a central axis perpendicular to a plane of the cutter body;
    a plurality of cutting insert receiving pockets formed about a perimeter of the body;
    a plurality of wedge receiving pockets formed about the perimeter of the cutter body;
    a cutting insert replaceably mounted in each insert receiving pocket of the cutter body;

a clamping wedge replaceably mounted in each wedge receiving pocket of the cutter body; and a cantilevered member disposed between each insert receiving pocket and a respective wedge receiving pocket, wherein the cantilevered member includes a top surface for engaging the clamping wedge and a bottom surface for engaging the cutting insert, and wherein the top surface of the cantilevered member includes a rack feature in the form of a plurality of grooves and a plurality of bumps therebetween for cooperating with a rack and pinion splined wrench to move the clamping wedge in a radial direction with respect to the central axis of the cutter body.

11. The slotting cutter according to claim 10, wherein the cantilevered member includes an undercut feature and a pair of slots extending radially inward with respect to the undercut feature toward the central axis of the cutter body, each slot having a width and a length, wherein a thickness, $t_3$, of the cantilevered member along the entire length of the pairs of slots is greater than a thickness, $t_2$, of the cantilevered member at the undercut feature.

12. The slotting cutter according to claim 11, wherein the undercut feature comprises opposing grooves that are located at a radial distance from the central axis approximately equal to a rearward wall of the plurality of cutting insert receiving pockets.

13. The slotting cutter according to claim 10, wherein the top surface of the cantilevered member is complementary in shape to a bottom surface of the clamping wedge.

14. The slotting cutter according to claim 10, wherein the bottom surface of the cantilevered member is complementary in shape to a top surface of the cutting insert.

15. The slotting cutter according to claim 10, wherein the insert receiving pocket is defined by a rearward wall, a bottom wall and a radius at the intersection between the rearward wall and the bottom wall.

16. The slotting cutter according to claim 10, wherein the wedge receiving pocket is defined by a rearward wall and a top wall for engaging the clamping wedge.

17. The slotting cutter according to claim 16, wherein the top wall of the wedge receiving pocket is formed at a taper angle with respect to the top surface of the cantilevered member.

18. A slotting cutter, comprising:

a disc-like cutter body rotatable in a predetermined direction on a central axis perpendicular to a plane of the cutter body;

a plurality of cutting insert receiving pockets formed about a perimeter of the body, each insert receiving pocket defined by a rearward wall, a bottom wall and a radius at the intersection between the rearward wall and the bottom wall;

a plurality of wedge receiving pockets formed about the perimeter of the cutter body, each the wedge receiving pocket defined by a rearward wall and a top wall for engaging the clamping wedge;

a cutting insert replaceably mounted in each insert receiving pocket of the cutter body, the cutting insert including a top surface and a bottom surface;

a clamping wedge replaceably mounted in each wedge receiving pocket of the cutter body;

a cantilevered member disposed between each insert receiving pocket and a respective wedge receiving pocket, the cantilevered member including an undercut feature and a pair of slots extending radially inward with respect to the undercut feature toward the central axis of the cutter body, the cantilevered member including a top surface for engaging the bottom surface of the clamping wedge and a bottom surface for engaging the top surface of the cutting insert, wherein the top surface of the cantilevered member is complementary in shape to the bottom surface of the clamping wedge, and wherein the bottom surface of the cantilevered member is complementary in shape to the top surface of the cutting insert, and wherein a thickness, $t_1$, between the top surface and the bottom surface of the cantilevered member is greater than a thickness, $t_2$, of the cantilevered member at the undercut feature, and wherein a thickness, $t_3$, of the cantilevered member along the pairs of slots is greater than or equal to the thickness, $t_1$, of the cantilevered member between the top surface and the bottom surface of the cantilevered member.

19. The slotting cutter according to claim 18, wherein the undercut feature comprises opposing grooves that are located at a radial distance from the central axis approximately equal to the rearward wall of the plurality of cutting insert receiving pockets.

* * * * *